US012340435B2

(12) United States Patent
Carey et al.

(10) Patent No.: US 12,340,435 B2
(45) Date of Patent: *Jun. 24, 2025

(54) SYSTEM AND METHOD FOR THREE-DIMENSIONAL SCAN OF MOVING OBJECTS LONGER THAN THE FIELD OF VIEW

(71) Applicant: Cognex Corporation, Natick, MA (US)

(72) Inventors: Ben R. Carey, Cambridge, MA (US); Andrew Parrett, Boston, MA (US); Yukang Liu, Natick, MA (US); Gilbert Chiang, West Linn, OR (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,192

(22) Filed: Sep. 5, 2023

(65) Prior Publication Data
US 2024/0177260 A1    May 30, 2024

Related U.S. Application Data

(63) Continuation of application No. 17/179,294, filed on Feb. 18, 2021, now Pat. No. 11,748,838.
(Continued)

(51) Int. Cl.
*G06T 7/292*    (2017.01)
*G06T 1/00*    (2006.01)
(Continued)

(52) U.S. Cl.
CPC .......... *G06T 1/0014* (2013.01); *G06T 7/0004* (2013.01); *G06T 7/251* (2017.01);
(Continued)

(58) Field of Classification Search
CPC .... G06V 20/64; G06V 20/647; G06V 20/653; G06V 2201/12; G06K 9/00;
(Continued)

(56) References Cited

U.S. PATENT DOCUMENTS 7,974,714 B2    7/2011    Hoffberg
8,561,897 B2    10/2013    Kunzig
(Continued)

FOREIGN PATENT DOCUMENTS

CN    104796617 A  *  7/2015
CN    107651211 A     2/2018
(Continued)

*Primary Examiner* — Fan Zhang
*Assistant Examiner* — Michael Adam Shariff
(74) *Attorney, Agent, or Firm* — Loginov & Associates, PLLC; William A. Loginov (57) ABSTRACT

This invention provides a system and method for using an area scan sensor of a vision system, in conjunction with an encoder or other knowledge of motion, to capture an accurate measurement of an object larger than a single field of view (FOV) of the sensor. It identifies features/edges of the object, which are tracked from image to image, thereby providing a lightweight way to process the overall extents of the object for dimensioning purposes. Logic automatically determines if the object is longer than the FOV, and thereby causes a sequence of image acquisition snapshots to occur while the moving/conveyed object remains within the FOV until the object is no longer present in the FOV. At that point, acquisition ceases and the individual images are combined as segments in an overall image. These images can be processed to derive overall dimensions of the object based on input application details.

13 Claims, 8 Drawing Sheets

Related U.S. Application Data (60) Provisional application No. 62/978,269, filed on Feb. 18, 2020.

(51) Int. Cl.
  *G06T 7/00* (2017.01)
  *G06T 7/246* (2017.01)
  *G06T 7/80* (2017.01)
  *G06V 20/64* (2022.01)

(52) U.S. Cl.
  CPC ............... *G06T 7/292* (2017.01); *G06T 7/85* (2017.01); *G06V 20/64* (2022.01); *G06V 2201/12* (2022.01)

(58) Field of Classification Search
  CPC ....... G06T 2200/04; G06T 7/292; G06T 7/85; G06T 7/251; G06T 7/20; G06T 7/285; G06T 7/70; G06T 7/73; G06T 7/80; G06T 2207/10012; G06T 2207/10028; G06T 7/60; G06T 7/62; G06T 1/0014; G06T 7/0004; G06T 7/30; G06T 7/33; G06T 7/38; G06T 7/97; G06T 7/55; G06T 7/579; G06T 7/593; G06T 7/596; G01S 17/89
  See application file for complete search history.

(56) References Cited

U.S. PATENT DOCUMENTS

| | | | |
|---|---|---|---|
| 8,939,369 B2 * | 1/2015 | Olmstead | G06K 7/10861 235/444 |
| 9,684,380 B2 | 6/2017 | Kramer | |
| 10,129,478 B2 | 11/2018 | Zhao | |
| 10,325,376 B2 | 6/2019 | Smits | |
| 10,556,356 B2 | 2/2020 | Rivers | |
| 10,579,875 B2 | 3/2020 | Dal Mutto | |
| 10,642,364 B2 | 5/2020 | Minnen | |
| 11,010,910 B2 | 5/2021 | Harmsen | |
| 11,057,590 B2 | 7/2021 | Seiger | |
| 11,087,484 B2 * | 8/2021 | Hafner | G06T 7/33 |
| 11,216,868 B2 | 1/2022 | Glaser | |
| 11,367,172 B2 * | 6/2022 | Voyer | H04N 7/181 |
| 2013/0292470 A1 | 11/2013 | Shearin | |
| 2015/0360877 A1 * | 12/2015 | Shin | G06V 20/64 382/103 |
| 2016/0047662 A1 | 2/2016 | Ricci | |
| 2018/0068266 A1 | 3/2018 | Kirmani | |
| 2018/0106422 A1 | 4/2018 | Saika | |
| 2018/0107999 A1 | 4/2018 | Rizzolo | |
| 2018/0189763 A1 | 7/2018 | Olmstead | |
| 2018/0197139 A1 | 7/2018 | Hill | |
| 2019/0035159 A1 | 1/2019 | Tran | |
| 2019/0297258 A1 | 9/2019 | Trevor | |

FOREIGN PATENT DOCUMENTS

| | | | |
|---|---|---|---|
| CN | 104796617 B | 8/2018 | |
| CN | 109478320 | 3/2019 | |
| JP | H07159129 A | 6/1995 | |
| JP | 2006084445 A | 3/2006 | |
| JP | 2008170298 A * | 7/2008 | |
| JP | 2019196927 A | 11/2019 | |
| WO | WO-2016065063 A1 * | 4/2016 | G06T 17/05 |

* cited by examiner

SYSTEM AND METHOD FOR THREE-DIMENSIONAL SCAN OF MOVING OBJECTS LONGER THAN THE FIELD OF VIEW

RELATED APPLICATION

This application is a continuation of U.S. patent application Ser. No. 17/179,294, entitled SYSTEM AND METHOD FOR THREE-DIMENSIONAL SCAN OF MOVING OBJECTS LONGER THAN THE FIELD OF VIEW, filed Feb. 18, 2021, which claims the benefit of U.S. Provisional Application Ser. No. 62/978,269, entitled SYSTEM AND METHOD FOR THREE-DIMENSIONAL SCAN OF MOVING OBJECTS LONGER THAN THE FIELD OF VIEW, filed Feb. 19, 2020, the teachings of which are incorporated herein by reference.

FIELD OF THE INVENTION

This invention relates to machine vision systems that analyze objects in three-dimensional (3D) space, and more particularly to systems and methods for analyzing objects that are transported through an inspection area on a conveyor.

BACKGROUND OF THE INVENTION

Machine vision systems (also termed herein, "vision systems") that perform measurement, inspection, alignment of objects and/or decoding of symbology (e.g. bar codes—also termed "ID Codes") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities.

As described above, one or more vision system camera(s) can be arranged acquire two-dimensional (2D) or three-dimensional (3D) images of objects in an imaged scene. 2D images are typically characterized as pixels with an x and y component within an overall N×M image array (often defined by the pixel array of the camera image sensor). Where images are acquired in 3D, there is a height or z-axis component, in addition to the x and y components. 3D image data can be acquired using a variety of mechanisms/techniques, including triangulation of stereoscopic cameras, LiDAR, time-of-flight sensors and (e.g.) laser displacement profiling.

In general, 3D cameras are arranged to capture a 3D image information for object that fall within their field of view (FOV), which constituted a volume space that fans outwardly along the transverse x and y dimensions, as a function of distance from the camera sensor in the orthogonal z-dimension. Sensors that acquire an image of the entire volume space concurrently/simultaneously (i.e. in a "snapshot") are termed "area scan sensors". Such area scan sensors are distinguished from line scan sensors (e.g. profilers) that capture 3D information slice-by-slice, and use motion (e.g. conveyor movement) and the measurement of this motion (e.g. via a motion encoder or stepper) to move the object through the inspection area/FOV.

An advantage to a line scan sensor is that the object under inspection can be arbitrarily long—with object length being taken along the conveyor motion direction. Conversely, area scan sensors, taking an image snapshot of the volume space, do not require encoders to capture a 3D scene, but if an object is longer than the field of view, then the full object cannot be imaged in a single snapshot. If only part of the object has been acquired in a single snapshot, then a further snapshot (or plurality of snapshots) of the remaining length must be acquired as the trailing portions of the object (not-yet-imaged) pass into the FOV. With multiple snapshots, a challenge is how to register (stitch together) the plurality of 3D images in an efficient manner so that an overall 3D image accurately represents the object's features.

SUMMARY OF THE INVENTION

This invention overcomes disadvantages of the prior art by providing a system and method for using an area scan sensor of a vision system, in conjunction with an encoder or other knowledge of motion, to capture an accurate measurement of an object larger than a single field of view (FOV) of the sensor. The system and method particularly addresses the disadvantage that the snapshot area scan vision system defines a limited field of view, which typically requires the system to acquire a plurality of snapshots, and other data needed to combine the snapshots. This avoids the task of combining raw image data and then post processing such data, which can be computationally intensive. The exemplary embodiment, instead, identifies features/edges (also termed "vertices" in relation to identified polygonal shapes) of the object, which are tracked from image to image, thereby providing a lightweight way to process the overall extents of the object for dimensioning purposes. The system and method can employ logic that automatically determines if the object is longer (in the conveyance direction) than the FOV, and thereby causes a sequence of image acquisition snapshots to occur while the moving/conveyed object remains within the FOV until the object is no longer present in the FOV. At that point, acquisition ceases and the individual images can be optionally combined as segments in an overall image. Overall image data can be used in a variety of downstream processes. The aggregate feature data from discrete image snapshots, that is derived with, or without, generating an actual overall image can be processed to derive overall dimensions of the object based on input application details. Such aggregate feature data can be employed to determine other properties and characteristics of the object(s) including, but not limited to, skew, over-tolerance for length, width and/or height, confidence score, liquid volume, categorization, quantity (QTY) of data actually imaged of the object versus expected data imaged of the object, object location features, and/or damage detection relative to the object. The system and method can also join complex/multilevel objects that would typically be separated by conventional imaging with area scan sensors due to lost 3D data from shadows, etc.

In an illustrative embodiment, a vision system and method of use thereof is provided. The vision system and method can include a 3D camera assembly, arranged as an area scan sensor, and a vision system processor receiving 3D data from images of an object acquired within a field of view (FOV) of the 3D camera assembly. The object can be conveyed in a conveying direction through the FOV and the object can define an overall length in the conveying direction longer that the FOV. A dimensioning processor measures the overall length based upon motion tracking information derived from the conveying of the object through the FOV in combination with a plurality of 3D images of the object. The images can be acquired by the 3D camera assembly in a sequence with predetermined amounts of conveying motion between the 3D images. A presence detector, associated with the FOV, can provide a presence signal as the object is located adjacent thereto. The dimensioning processor, in response to the presence signal, can be arranged to determine if the object appears in more than one image as the object moves in the conveying direction. The dimensioning processor, in response to information related to features on the object, can be arranged to determine if the object is longer than the FOV as the object moves in the conveying direction. An image processor can combine the information related to the features on the object from consecutive image acquisitions by the 3D camera that generates aggregate feature data, so as to determine overall the dimensions of the object in a manner free of combining discrete, individual images into an overall image. Illustratively, the image processor can be arranged, in response to the overall length of the object being longer than the FOV, to acquire a sequence of image acquisition snapshots while the object remains within the FOV and until the object departs from the FOV. The image processor can be further arranged to derive overall attributes of the object using the aggregate feature data and based on input application data, and wherein the overall attributes comprise at least one of confidence score, object classification, object dimensions, skew and object volume. An object handling process that, based upon the overall attributes, can perform a task with respect to the object comprising at least one of redirecting the object, rejecting the object, issuing an alert and righting skew in the object. Illustratively, the object can be conveyed by a mechanical conveyor or a manual operation, and/or the tracking information can be generated by an encoder operatively connected to the conveyor. The motion sensing device can be operatively connected to the conveyor, an external feature sensing device and/or a feature-based sensing device. The presence signal can be used by the dimensioning processor to determine a continuity of the object between each of the images as the object moves in the conveying direction. The plurality of images can be acquired by the 3D camera with a predetermined overlap therebetween, and a removal process can employ the tracking information to remove overlap sections from object dimensions to determine the overall length. An image rejection process can reject a last one of the plurality of images that is acquired as a result of the presence signal being asserted after a previous one of the plurality of images contains a rear edge of the object. The dimensioning processor can be further arranged to employ information related to features on the object to determine continuity of the object between each of the images as the object moves in the conveying direction. The dimensioning system can further define a minimum spacing between objects in the images, below which a plurality of objects are considered a single object with missing 3D image data. Illustratively, the image processor can be arranged to generate aggregate feature data with respect to the object in relation to (a) out-of-length limit data, (b) out-of-width limit data, (c) out-of-height limit data, (d) out-of-volume limit data, (e) confidence score, (f) liquid volume, (g) categorization, (h) quantity (QTY) of data actually imaged of the object versus expected data imaged of the object, (i) location features of the object, and/or (j) detection of damage relative to the object.

In an illustrative embodiment a vision system, and associated method, can include a 3D camera assembly arranged as an area scan sensor with a field of view (FOV) that can operate an acquisition process that captures one or more images of an object as it passes through the FOV and determines (a) if the object will occupy more than a single image, (b) determines when the object will no longer occupy the next image, and (c) calculates a size and relative angle of the object from the one or more images acquired.

In an illustrative embodiment, a method for dimensioning an object can be provided, using a vision system having a 3D camera assembly, arranged as an area scan sensor, with a vision system processor receiving 3D data from images of an object acquired within a field of view (FOV) of the 3D camera assembly. The object can be conveyed in a conveying direction through the FOV, and the object can define an overall length in the conveying direction longer that the FOV. The method can further include the step of measuring the overall length based upon motion tracking information derived from the conveying of the object through the FOV in combination with a plurality of 3D images of the object, acquired by the 3D camera assembly in a sequence, with predetermined amounts of conveying motion between the 3D images. A presence signal can be generated as the object is located adjacent to the FOV, and, in response to the presence signal, it can be determined whether the object appears in more than one image as the object moves in the conveying direction. In response to information related to features on the object, it can be determined if the object is longer than the FOV as the object moves in the conveying direction. The information related to the features on the object from consecutive image acquisitions by the 3D camera can be combined to generate aggregate feature data, so as to provide overall the dimensions of the object in a manner free of combining discrete, individual images into an overall image. Illustratively, in response to the overall length of the object being longer than the FOV, a sequence of image acquisition snapshots can be acquired while the object remains within the FOV and until the object departs from the FOV. Overall attributes of the object can be derived using the aggregate feature data and based on input application data, and the overall attributes can comprise at least one of confidence score, object classification, object dimensions, skew and object volume. Illustratively, the method can perform, based upon the overall attributes, a task with respect to the object comprising at least one of redirecting the object, rejecting the object, issuing an alert and righting skew in the object. Illustratively, the presence signal can be used to determine a continuity of the object between each of the images as the object moves in the conveying direction. In combining the information, the method can further generate (a) out-of-length limit data, (b) out-of-width limit data, (c) out-of-height limit data, (d) out-of-volume limit data, (e) confidence score, (f) liquid volume, (g) categorization, (h) quantity (QTY) of data actually imaged of the object versus expected data imaged of the object, (i) location features of the object, and/or (j) detection of damage relative to the object. A minimum spacing between objects in the images can be defined, and below which minimum spacing, a plurality of imaged objects are considered to be a single object with missing 3D image data.

BRIEF DESCRIPTION OF THE DRAWINGS

The invention description below refers to the accompanying drawings, of which.

DETAILED DESCRIPTION

I. System Overview

Figure 1:
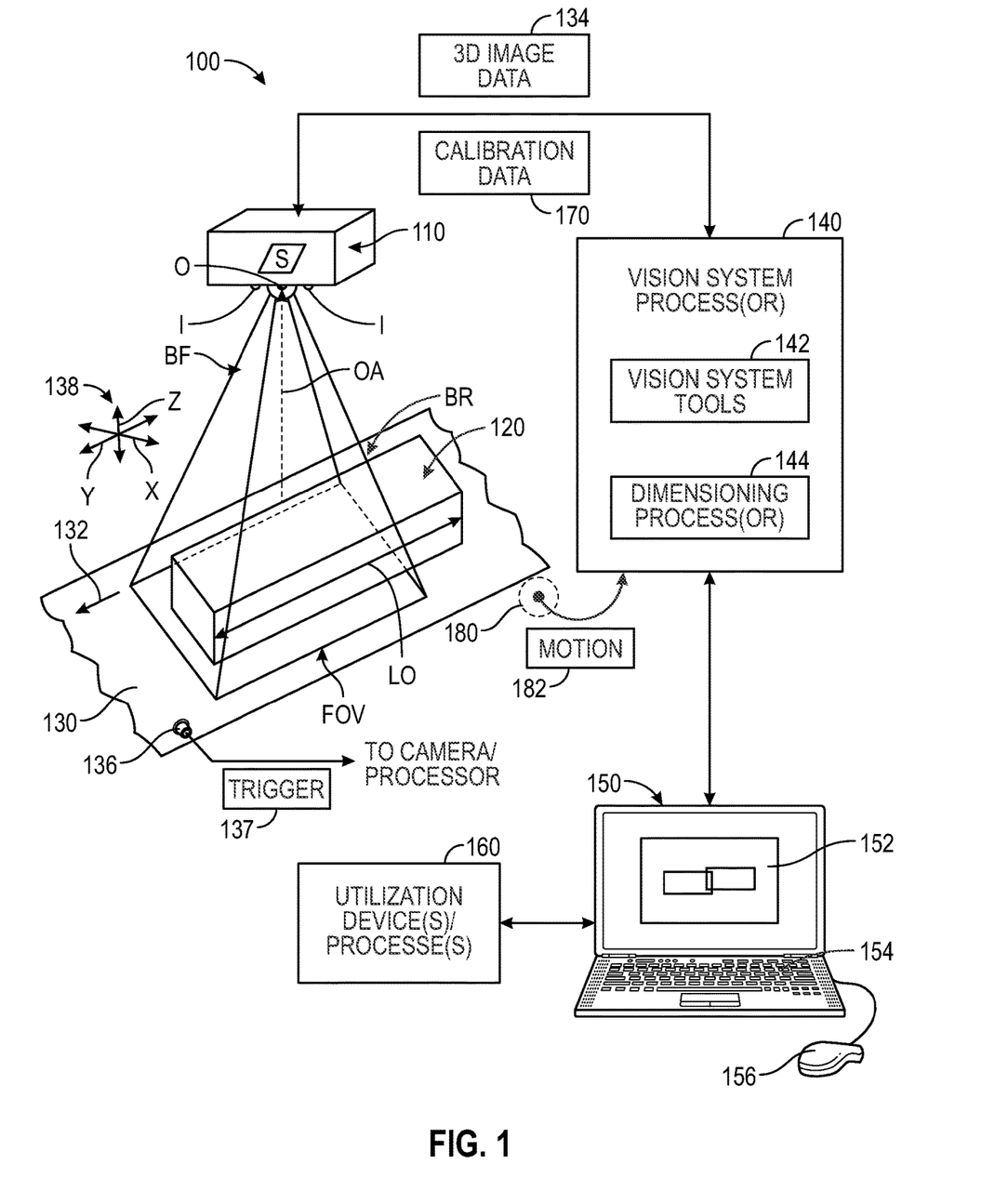
FIG. 1 is an overview of a system for acquiring and processing 3D images of objects longer than the field of view with an area scan sensor, which employs a dimensioning process(or) to generate an overall image from a plurality of snapshots as the objects moves through the field of view.

FIG. 1 shows an overview of an arrangement 100 in which a vision system camera assembly (also termed simply "camera" or "sensor") 110 acquires 3D image data of exemplary object 120 as it passes beneath its field of view (FOV) with respect to a moving conveyor 130 moving in a downstream direction (arrow 132). The local/relative 3D coordinate system 138 is shown with x, y and z orthogonal coordinates, by way of example. Other coordinate systems, such as polar coordinates, can be used to represent the 3D space. Note that, in this example, the object 120 defines an upstream-to-downstream (generally along the y-axis/direction of motion) length LO that is longer than the upstream and downstream boundaries BF and BR of the FOV, which is further described below.

The 3D camera/imaging assembly 110 contemplated herein can be any assembly that acquires 3D images of objects including, but not limited to, stereo cameras, time-of-flight cameras, LiDAR, ultrasonic range-finding cameras, structured illumination systems, and laser-displacement sensors (profilers), and thus, the term 3D camera should be taken broadly to include these systems and any other system that generates height information in association with a 2D image of an object. Also, a single camera, or an array of a plurality of cameras, can be provided and the terms "camera" and/or "camera assembly" can refer to one or more cameras that acquire image(s) in a manner that generates the desired 3D image data for the scene. The depicted camera assembly 110 is shown mounted overlying the surface of the conveyor 130 in the manner of a checkpoint or inspection station that images the flowing objects as they pass by. In this embodiment, the camera assembly 110 defines an optical axis OA that is approximately perpendicular (along the z-axis) with respect to the surface of the conveyor 130. Other non-perpendicular orientations for the axis OA relative to the conveyor surface are expressly contemplated. The object 120 can remain in motion (typically) or stop momentarily for imaging, depending upon the operating speed of the conveyor and acquisition time for camera image sensor (S) and related electronics (depending, in part, upon frame rate and aperture settings) 110. The camera 110 acquires a 3D image of the object 120 is sufficiently within the FOV, which can be triggered by a photodetector or other triggering mechanism 136, and results in a trigger signal 137 to the camera 110 and associated processor(s). Hence, the camera assembly 110 in this embodiment is arranged as an area scan sensor.

The camera assembly 110 includes an image sensor S that is adapted to generate 3D image data 134. The camera assembly also includes an (optional) integral illumination assembly I—for example a ring illuminator of LEDs that projects light in a predictable direction with respect to the axis OA. External illumination (not shown) can be provided in alternate arrangements. An appropriate optics package O is shown in optical communication with the sensor S, along the axis OA. The sensor S communicates with an internal and/or external vision system process(or) 140 that receives image data 134 from the camera 110, and performs various vision system tasks upon the data in accordance with the system and method herein. The process(or) 140 includes underlying processes/processors or functional modules, including a set of vision system tools 142, which can comprise a variety of standard and custom tools that identify and analyze features in image data, including, but not limited to, edge detectors, blob tools, pattern recognition tools, deep learning networks, ID (e.g. barcode) finders and decoders, etc. The vision system process(or) 140 can further include a dimensioning process(or) 144 in accordance with the system and method. This process(or) 144 performs various analysis and measurement tasks on features identified in the 3D image data so as to determine the presence of specific features from which further results can be computed. The process(or) interfaces with a variety of conventional and custom (e.g. 3D) vision system tools 142 according to the exemplary embodiment.

System setup and results display can be handled by a separate computing device 150, such as a server (e.g. cloud-based or local), PC, laptop, tablet and/or smartphone. The computing device 150 is depicted (by way of non-limiting example) with a conventional display or touchscreen 152, keyboard 154 and mouse 156, which collectively provide a graphical user interface (GUI) functionality. A variety of interface devices and/or form factors can be provided in alternate implementations of the device 150. The GUI can be driven, in part, by a web browser application, which resides over a device operating system and displays web pages with control and data information from the process(or) 140 in accordance with an exemplary arrangement herein.

Note that the process(or) 140 can reside fully or partially on-board the housing of the camera assembly 110 and various process modules/tools 142 and 144 can be instantiated entirely or partially in either the on-board process(or) 140 or the remote computing device 150 as appropriate. In an exemplary embodiment, all vision system and interface functions can be instantiated on the on-board process(or) 140, and the computing device 150 can be employed primarily for training, monitoring and related operations with interface web pages (e.g. HTML) generated by the on-board-process(or) 140 and transmitted to the computing device via a wired or wireless network link. Alternatively, all or part of the process(or) 140 can reside in the computing device 150. Results from analysis by the processor can be transmitted to a downstream utilization device or process 160. Such device/process can use results 162 to handle objects/packages—for example gating the conveyor 130 to direct objects to differing destinations based upon analyzed features and/or rejecting defective objects.

The camera assembly includes on-board calibration data that is established by factory and/or field calibration procedures and that maps the x, y and z, coordinates of imaged pixels to the camera's coordinate space. This calibration data 170 is provided to the processor for use in analyzing image data. Also, in the exemplary embodiment, the conveyor and/or its drive mechanism (e.g. a stepper motor) includes an encoder, or other motion tracking mechanism, 180 that reports relative motion data 182 to the processor 140. Motion data can be delivered in a variety of ways—for example distance-based pulses that each define a predetermined increment of conveyor movement. By summing the pulses, total movement within a given time period can be determined.

Note that the term "conveyor" as used herein should be taken broadly to include an arrangement in which objects are passed through the FOV via another technique—for example manual motion. As such an "encoder", as defined herein can be any acceptable motion measurement/tracking device, including steppers, mark readers and/or those that track features or fiducials on the conveyor or object as they pass through the FOV, including various internal techniques that use knowledge of the underlying vision system application (e.g. with features in the image) to determine the degree of motion between image snapshots.

II. Dimensioning Process(or)

A. Setup

Figure 2:
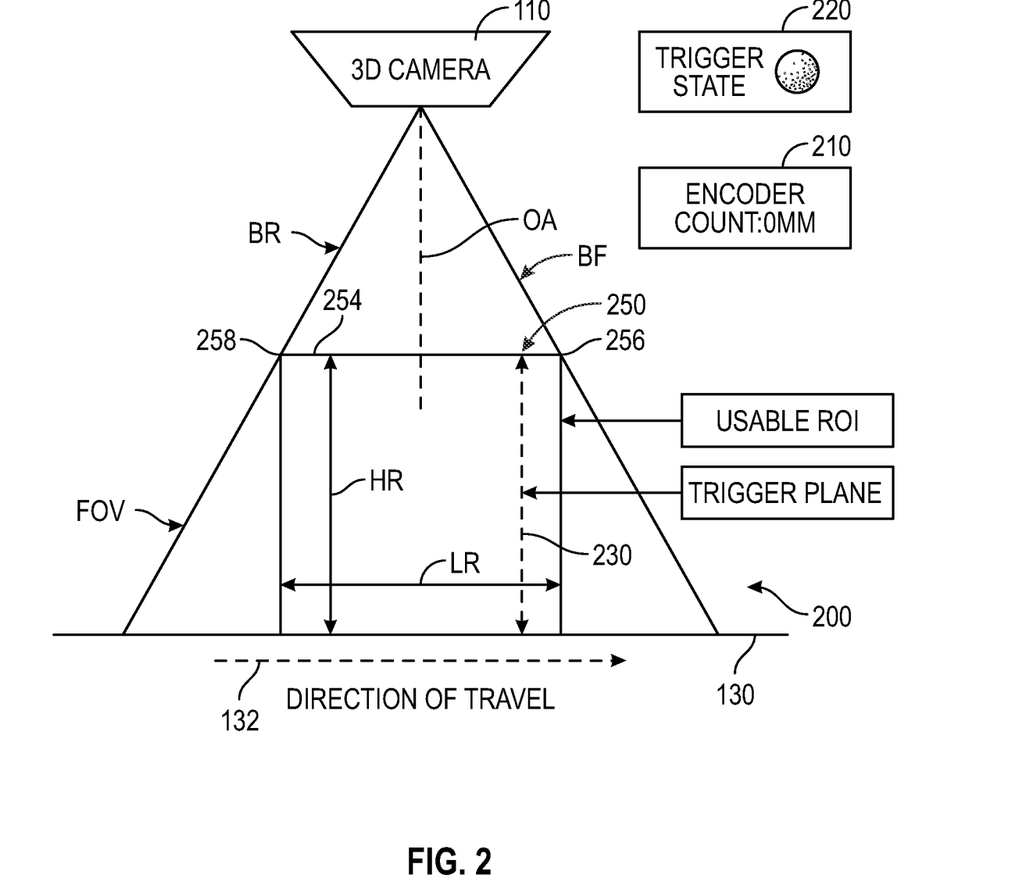
FIG. 2 is a diagram shown in a side view of the conveyor and area scan sensor arrangement of FIG. 1, detailing the FOV, usable region of interest for 3D imaging of an object trigger plane for image acquisition according to an exemplary embodiment.

FIG. 2 shows the setup of an arrangement 200, which is adapted to image objects that are longer, in the direction of motion 132, than the FOV. The camera assembly 110 is shown overlying a portion of the conveyor 130, which comprises an inspection station for such objects. The conveyor 130 delivers an encoder count 210, which can be reset with each trigger event, in which the conveyor 130 is depicted in the region of the 3D camera assembly. Triggers are issued (in this case the trigger state 220 is negative and a red, or other color/shade indicator is represented by dot-shading) each time an object passes through the trigger plane 230, which is aligned with the above described presence detector 136 (FIG. 1). The 3D FOV defines a useable region of interest 250 that extends upward along the camera axis OA from the surface of the conveyor 130, and on either side of the axis OA. In this example, the ROI defines a usable height HR, which can be defined by the user based upon maximum object height expected. The points 256, and 258 where the top 254 of the ROI 250 respectively intersects the front BF and rear BR boundaries of the FOV, effectively defines the length LR of the useable ROI in the direction of motion 132 (y-axis). Thus, the taller the maximum height HR of the ROI, the shorter the length LR.

B. Object Size Inference and Trigger/Encoder Logic

Figure 3:
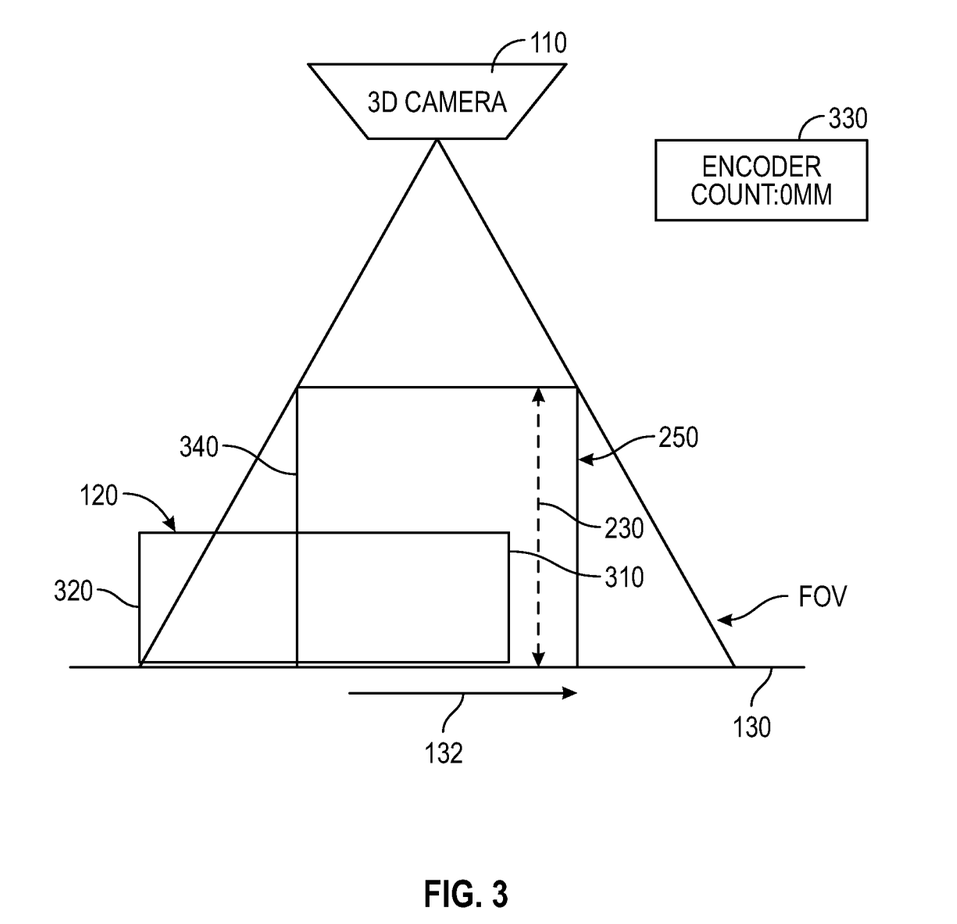
FIG. 3 is a diagram showing a runtime operation of the arrangement of FIGS. 1 and 2, with an exemplary object, having a length in the conveyance direction that is longer than the usable ROI, arriving at the trigger plane so as to trigger an initial snapshot.
Figure 4:
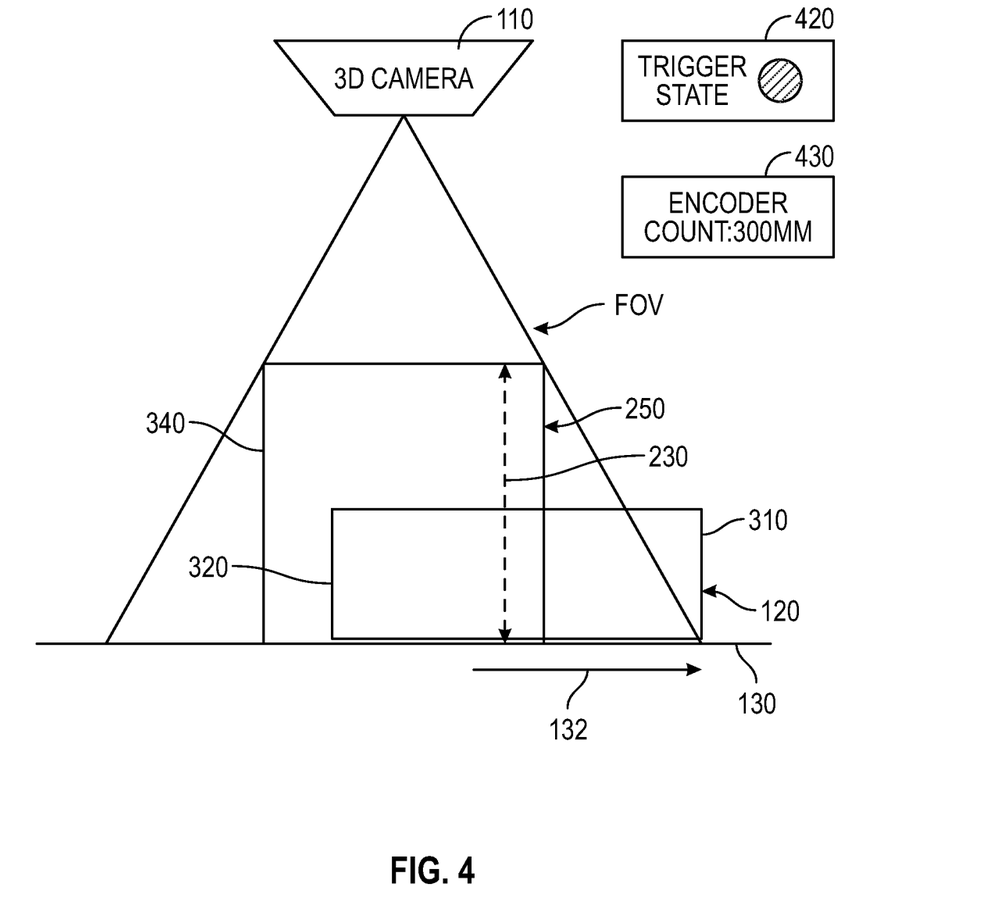
FIG. 4 is a diagram showing the runtime operation of FIG. 3, with the exemplary object passing partially out of the ROI and the encoder indicating a degree of motion thereof sufficient to trigger a second snapshot.

Having defined the useable ROI, the processor determines how many pulses the conveyor travels to achieve the length LR. Referring to FIG. 3, the system is shown operating in a runtime mode to infer the size (length) of the object 120, which is depicted with its front end 310 arriving at the trigger plane 230. The rear end 320 is outside the rear boundary 340 of the usable ROI 250. At this time, the 3D camera assembly is triggered to acquire a first image (snapshot) of the object, and the encoder count 330 is set to zero in the processor. The snapshot is analyzed to determine if the rear end of the object occurs within the ROI (using vision system tools, height changes, etc.). If the object 120 ends in a single ROI 250, then the snapshot is reported as a complete 3D image for that object, and the system awaits the next object/trigger. Conversely, if object 120 does not appear to end within the usable ROI (e.g. no substantial change in object geometry within the rear boundary 340 of the ROI 250), which is the case in FIG. 3, then the system stores the first image and counts one ROI length (LR) in encoder pulses (or a known proportion of this length LR). This count is referenced in FIG. 4, where the object rear 320 has now passed into the useable ROI 250 (past the rear ROI boundary 320 At this time (shown in FIG. 4) one ROI length LR of pulses have been counted. In this example, the pulse count 430 is 300 mm. This length is equal to or less than the length LR. As described below, the pulse count can be less than the length LR where an overlap between snapshot images is desired. This can ensure details are not lost at the edges of the image. As shown in FIG. 4, the trigger state 420 is also positive (represented by green or another color/shade and represented by hatch shading) at this stage, because the object is present at the trigger plane 230. This logical combination of events (positive trigger state and full encoder count) triggers the camera assembly to acquire a second snapshot of the object 120. This second snapshot is also stored in association with the object from the first snapshot.

The system analyzes the second snapshot to determine if the rear end 320 of the object 120 is now present downstream of the rear ROI boundary 340. If so, then the full object length has been imaged, and the two snapshots can be combined and processed as described further below. If the rear of the object is not in the ROI of the second snapshot, then the encoder count is reset, the trigger state 420 remains high due to the continuing presence of an object, and the system counts until the next ROI length LR is achieved. Yet another snapshot is taken and the above steps repeat until the nth snapshot, in which a rear end of the object is finally detected within the ROI 250. At this time the trigger goes low as the object passes fully out of the FOV and the image results are delivered. Because of the overlap between snapshot images there sometimes exists a special case, which can be handled by evaluating the encoder count between discrete image acquisitions. If the previous snapshot has imaged the edge of an object and reported a dimension, yet the trigger still goes high (positive), and a new snapshot is taken, then in this case, if the encoder count for the current snapshot is equivalent to the length of the ROI, the new snapshot is discarded and no dimension will be reported. This occurs because it is an extra/unused snapshot caused only by the overlap between snapshot images. In general, all snapshots can be combined for processing in association with a single object image, as described below.

C. Complex and/or Multiple Objects

Figure 5:
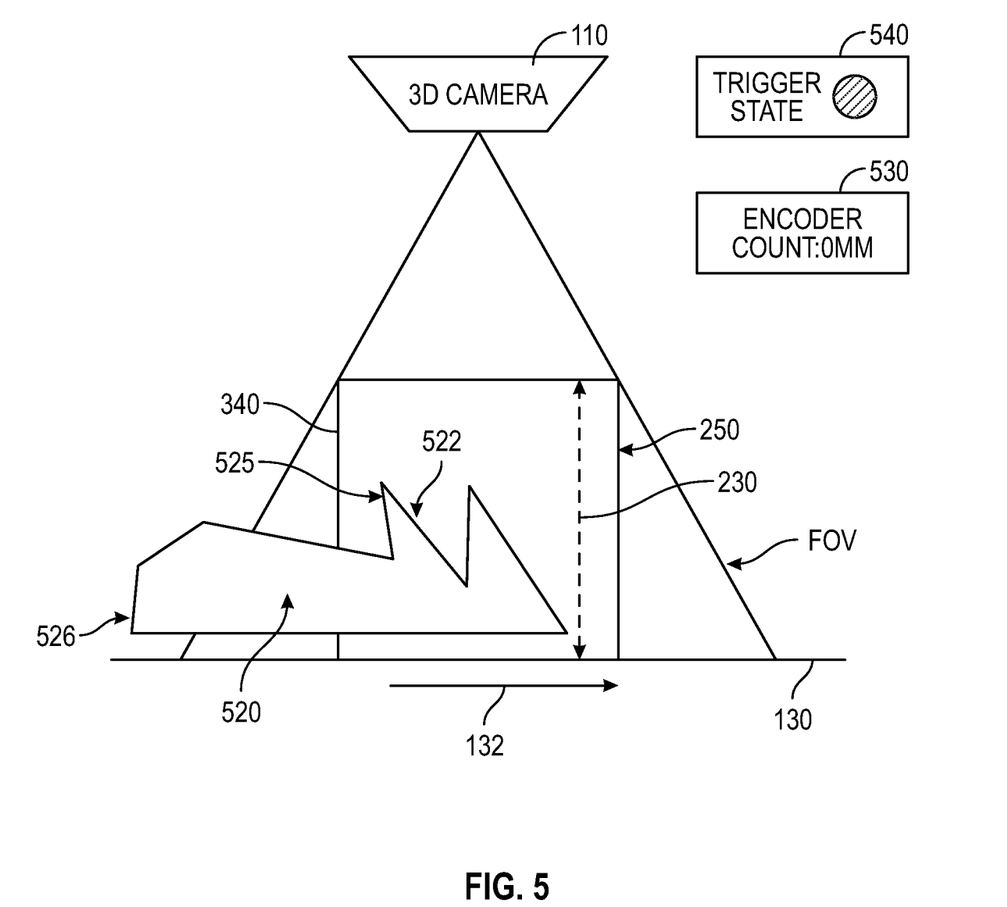
FIG. 5 is a diagram showing a runtime operation of the arrangement of FIGS. 1 and 2, with an exemplary object, representing a complex top surface that may result in the loss of 3D image data and/or indicate two discrete objects in the FOV.

In some implementation of runtime operation, the object can present a complex 3D shape. Referring to FIG. 5, and object 520, with a varying height along its top surface 522 and/or overhanging (occluded) features 525, is shown arriving at the trigger plane 230. At this time, the trigger state 540 becomes positive (green, as represented by hatch-shading) and the encoder count 530 starts from 0. However, the complex shape of the object may result in missing 3D image data or confuse the vision system processor as to the actual location of the object rear end 526—which in this example, is still located outside the usable ROI 250 when the first snapshot is acquired by the camera assembly 110. Referring also to the procedure 600 of FIG. 6, the object initially triggers the camera assembly to acquire a 3D snapshot in step 610. It is possible that a single (simple or complex shape) object or multiple objects are present in this initial image. The vision system analyzes the image to determine if multiple objects are detected—typically by looking for boundaries that extend to the conveyor surface (baseline), and gaps between separated boundaries. If two items are not detected, then the vision system treats the object as a single item (decision step 620). Conversely, if two or more objects are detected, then the decision step 620 of the procedure 600 branches to further decision step 630, in which the gap(s) is/are analyzed to determine whether the gap(s) are less than a minimum distance (determined using calibration data in the camera and conventional measurement techniques). If the gaps are greater than a minimum distance—which is set by the user, or automatically set—then the system denotes (step 640) multiple items in the image. Where two items with a greater-than-minimum gap distance (step 640), or a single item (decision step 620), the procedure 600 branches to decision step 650 where the vision system determines if all object ends are in the image and the trigger state has gone negative. If so, then the procedure 600 branches to step 660 in which the results of this image are output and the encoder is reset, awaiting the next object/trigger to occur. Conversely, if the trigger has not gone negative after the current (initial) image, and the rear end of the object(s) remain(s) outside the FOV, then decision step 650 branches to step 670, in which the camera assembly counts encoder pulses and acquires another snapshot of the FOV. This continues until the encoder goes negative and the rear of the object is detected.

Figure 6:
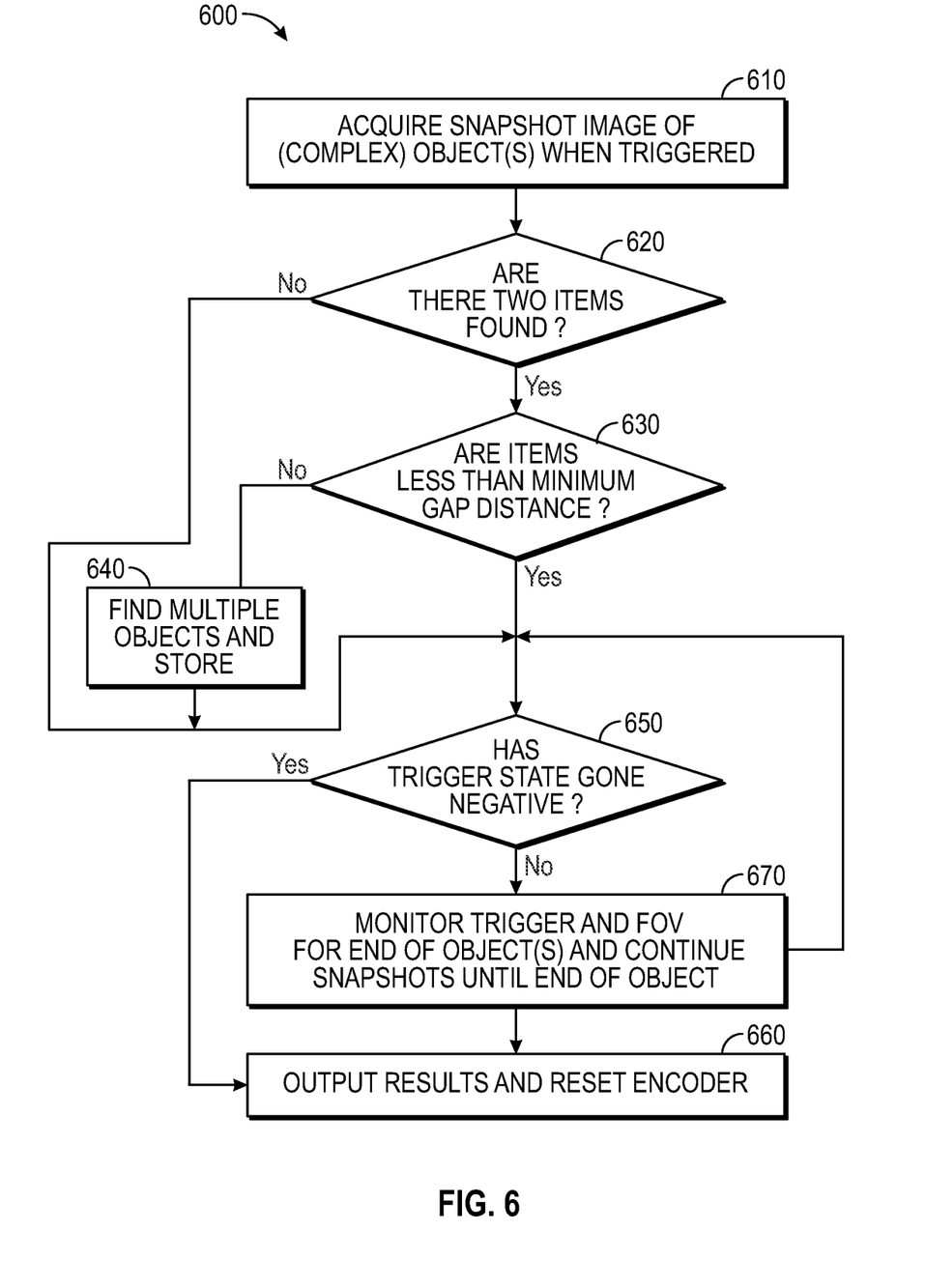
FIG. 6 is a flow diagram showing a procedure for operating a dimensioning process in accordance with an exemplary embodiment, including where multiple objects and/or complex objects are imaged.

Referring again to decision step 630, where a gap exists, but is less than the minimum distance, the procedure 600 assumes that the imaged contains a single object and that the gap is the result of absent or missing 3D data within the imaged object. Thus, the object is treated as if it is a single item and the decision step branches to further decision step 650 (described above), in which the presence or absence of the rear of the object in the image decides next steps. Note that one technique for predicting and providing absent or lost 3D image data is described in commonly assigned U.S. Provisional Application Ser. No. 62/972,114, entitled COMPOSITE THREE-DIMENSIONAL BLOB TOOL AND METHOD FOR OPERATING THE SAME, filed Feb. 10, 2020, the teachings of which are incorporated by reference as useful background information. Such a blob tool can be used in the generation of image results for delivery to further utilization procedures.

D. Image Data Tracking and Overlap of Results

Figure 7:
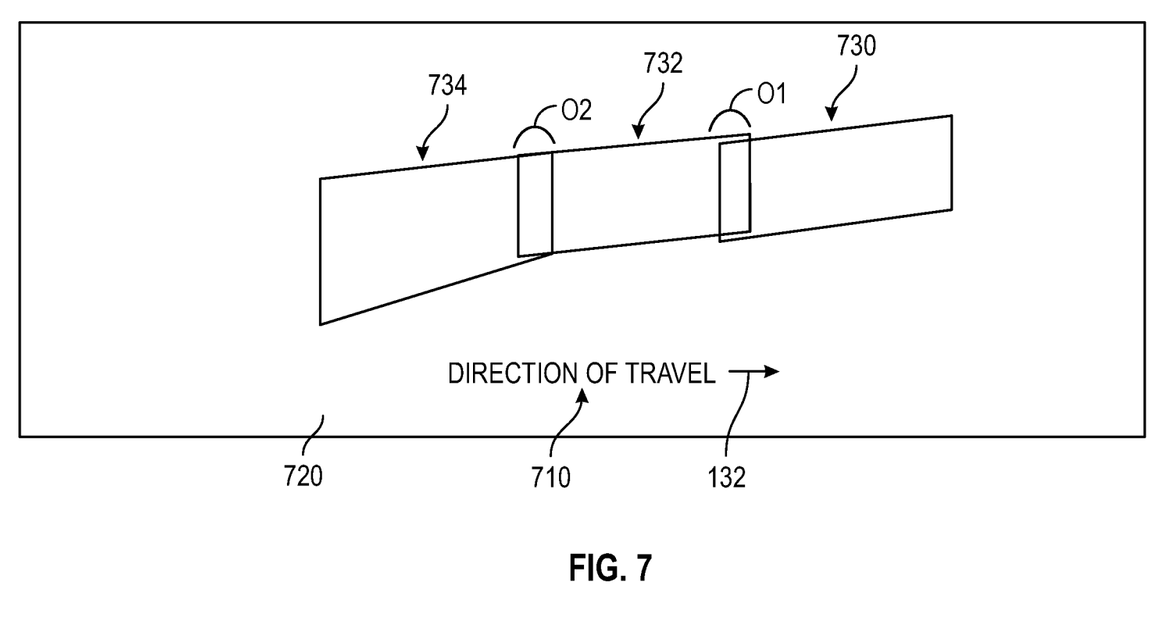
FIG. 7 is a diagram showing a top-down view of an imaged conveyor surface with the exemplary, overlapping image segments representing an overall imaged object.

Reference is made to FIG. 7, which shows a continuous top-down (x-y plane) view 710 of a conveyor belt 720 constructed from the results of (e.g.) three consecutive image acquisitions in the presence of a long object. The three acquired images 730, 732 and 734 of the overall object are shown in a sequence. Notably, the encoder count has been set so that a first predetermined overlap distance O1 resides between the first pair of images 730 and 732, and a second predetermined overlap distance O2 resides between the second pair of images 732 and 734. The use of an overlapping distance between object images ensures that acquired object features are not inadvertently omitted or obscured at the edge of the 3D ROI. The vision system can appropriately remove or blend the overlapping regions to compute the actual object dimensions and features as described below with reference to FIG. 8. Note that the term "features" as used herein should be taken to include, or can be used interchangeably with, the term "vertices" as the acquired image of the object generally defines one or more polygons with associated vertices that are employed to derive the bounds of the shape.

Figure 8:
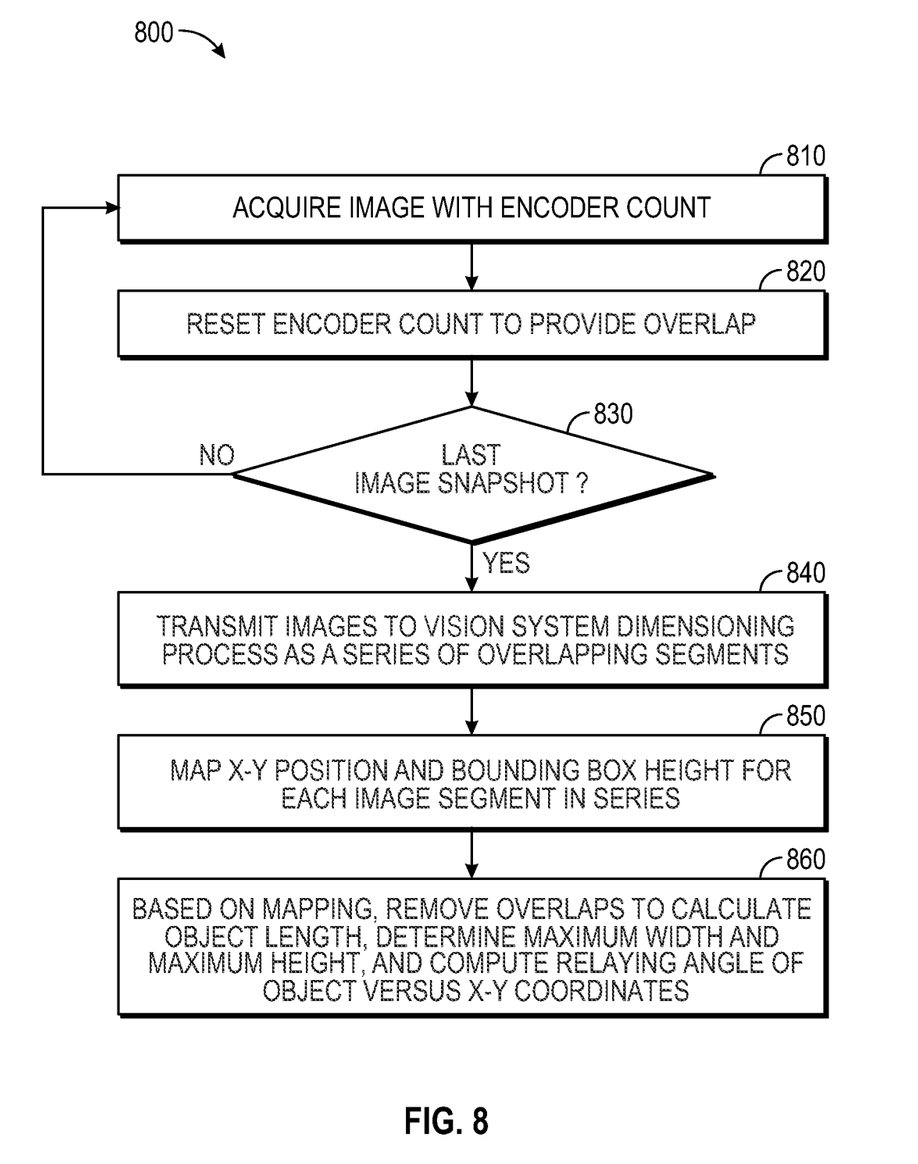
FIG. 8 is a flow diagram of a generalized image acquisition procedure for the arrangement of FIGS. 1 and 2, which is adapted to handle overlapping image segments as shown in FIG. 7, so as to generate overall length of the object, as well as its maximum width and height and relative angle with respect to the conveyance direction (or another coordinate system.

In operation, the procedure 800 of FIG. 8 starts with the acquisition, in step 810, of a 3D image in a manner described above. That is, a trigger is generated and the encoder is set to count the motion of the object through the FOV. After the count reaches a distance value that allows for an overlap with a subsequent image, the count is reset in step 820, and the system determines if that is the last image—with the object rear in the ROI. If not (via decision step 830), then the procedure 800 branches back to step 810 and another overlapping image is acquired. If the image is the last image in a sequence, then the procedure 800 branches (via decision step 830) to step 840, in which the series of 3D images (segments of the overall object) are transmitted to the dimensioning process(or) and related tools to have object dimensions determined and (optionally) features resolved. Using distances established by the encoder versus the image pixel locations, the x-y position and bounding box height for each object segment are mapped in step 850. Then, based upon this mapping, the overlaps (which constitute a given known encoder distance between segments) are removed to calculate the actual objet length. The resulting data can be defined as aggregate feature data that effectively combines the data from individual shapes to establish an overall picture or characterization of an object without (free of) an actual image of the combined object. This resulting, aggregate feature data can also be used to determine (e.g.) the maximum width and height of the overall object, as well as its relative angle with respect to the direction of conveyor motion (step 860). This information is particularly helpful in various utilization processes, such as logistics to ensuring proper handling of objects (e.g. packages).

Note, it is expressly contemplated that the generation of an actual overall (composite or stitched-together) image from the discrete image acquisitions (snapshots) is optional according to the system and method herein. The aggregate feature data can be used independent of creation of an N×M pixel-based overall image to provide appropriate results used to determine object dimensions and/or other processes described below. An overall image can be generated and employed in further processes and/or to provide a visual record of all or part of an image object when desired.

E. Application of Results

It is contemplated that the resulting aggregate feature data (an/or data related to vertices) from the above-described operations can be applied to a variety of tasks and functions relative to imaged objects, including, but not limited to, a stream of varying size and shape packages. Notable, the process herein can be used to determine a skew angle of the object/package relative to (e.g.) a direction of travel and/or boundaries of the surrounding supporting surface. One potential issue that can be identified and measured using the aggregate feature data herein is skew angle of an object relative to the direction of conveyor travel (and parallel side edges) or other supporting surface. In addition to potentially causing a jam at a narrowed chute, gate or other transition, the skewed data causes an object to appear longer than its regular dimensions normal, and can cause the system to generate a false defect. The skew angle data should be accounted for so that corrective action (i.e. ignoring the false defect or straightening the object) can occur. Notably, skew angle information (and/or other measured characteristics) can be part of a metadata tag applied to the results (aggregate feature data) for use in various downstream operations. Other related feature data can include out-of-length limit, out-of-width limit, out-of-height limit and/or out-of-volume limit values, which would indicate when an object is too long, wide, high or voluminous for the limits of the parameters. Further related data can be related, but not limited, to:

(a) confidence score, which can inform either the shape of the object or the quality of the data received;
(b) liquid volume, which can inform the shape of the object or the true (not minimum cuboid) volume;
(c) categorization, which can inform the form of the objects surface as being flat or not;
(d) the quantity (QTY) of data viewed/imaged versus how much would be expected to be viewed/imaged;
(e) location features (e.g. corners, centroid, distance from a reference such as an edge of the conveyor belt); and/or
(f) damage detection (e.g. the presence of bulge/dented packages based upon the actual imaged shape versus an expected shape).

The use of aggregate feature data that generally avoids the need to include the more-detailed pixel-based image data for a combined object thereby allows for additional processes to be performed with respect to objects. In handling and manipulating such aggregate feature data, the data's overall size allows for more rapid processing and lower-processor overhead. Some exemplary tasks can include automating of processes in warehouses—for example rejecting and/or redirecting objects that are non-conforming in size and/or shape. The use of such data to divert an object can, thus, server to having such an oversized object become jammed in a chute or at a bend in the conveyor. Similarly, the aggregate feature data derived by this system and method can assist an automated labeling processes in ensuring that the location of an object is correct. Also, as described above, skew information can be used to avoid a false defect condition and/or allow the system or a user to right the object within the conveyor stream, thus avoiding a soft jam condition. Other data-dependent object/package-handling tasks can employ the data in a manner that should be clear to those of skill.

III. Conclusion

It should be clear that the above-described system and method provides an effective, reliable and robust technique for determining the length of oversized objects that may not fully fit within the FOV of a 3D area scan sensor along the movement direction of a conveyor. This system and method uses conventional encoder data and detector triggers to generate an accurate set of object dimensions and can operate in the presence of lost or absent 3D data due to complex shapes and/or where multiple objects are present in the conveyor stream.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A 3D camera assembly having a Field of View (FOV) defining a usable region of interest (ROI), and comprising:
    an area scan sensor, configured to acquire 3D images of an object moving through the FOV, wherein the object defines an overall length between opposing edges of the object longer than the FOV; and
    at least one processor in communication with the area scan sensor and configured to:
        receive a plurality of 3D images from the area scan sensor, the plurality of 3D images having a known amount of object movement between image acquisitions;
        determine the overall length of the object based upon motion tracking information derived from the movement of the object through the FOV in combination with the plurality of 3D images;
        receive a presence signal indicative of the object being located adjacent to the FOV, and, in response to the presence signal, determine if the object appears in more than one image as the object moves through the FOV;
        in response to information related to features on the object, determine if the object is longer than the FOV as the object moves through the FOV;
        determine a length LR of the usable ROI based upon the motion tracking information, wherein, when the length LR of the usable ROI is greater than the known amounts of object motion between the 3D images, including determining an overlapping of the 3D images so that the opposing edges are included in the overlapping; and combine the information related to the features on the object from the plurality of 3D images to generate aggregate feature data, so as to provide a dimension of the object in a manner free of combining discrete, individual images into an overall image.

2. The 3D camera assembly as set forth claim 1, wherein, the at least one processor is arranged, in response to the overall length of the object being longer than the FOV, to acquire a sequence of image acquisition snapshots while the object remains within the FOV and until the object departs from the FOV.

3. The 3D camera assembly as set forth in claim 2, wherein the at least one processor is arranged to derive overall attributes of the object using the aggregate feature data and based on input application data, and wherein the overall attributes comprise at least one of confidence score, object classification, object dimensions, skew, or object volume.

4. The 3D camera assembly as set forth in claim 1, further comprising, an object handling process that, based upon the overall attributes, performs a task with respect to the object comprising at least one of redirecting the object, rejecting the object, issuing an alert, or righting skew in the object.

5. The 3D camera assembly as set forth in claim 1, wherein the object is conveyed by a mechanical conveyor or a manual operation.

6. The 3D camera assembly as set forth in claim 5, wherein the motion tracking information is generated by an encoder operatively connected to the conveyor, a motion sensing device operatively connected to the conveyor, an external feature sensing device or a feature-based sensing device.

7. The 3D camera assembly as set forth in claim 1, wherein the presence signal is used by a dimensioning process to determine a continuity of the object between each of the 3D images as the object moves in a motion direction.

8. The 3D camera assembly as set forth in claim 7, wherein the plurality of 3D images are acquired by the 3D camera with a predetermined overlap therebetween, and the at least one processor further configured to remove overlap sections from object dimensions to determine the overall length.

9. The 3D camera assembly as set forth in claim 8, wherein the at least one processor is further configured to employ an image rejection process that rejects a last one of the plurality of 3D images that is acquired as a result of the presence signal being asserted after a previous one of the plurality of 3D images contains a rear edge of the object.

10. The 3D camera assembly as set forth in claim 8, wherein the at least one processor is further configured to employ a dimensioning process that defines a minimum spacing between objects in the images, below which a plurality of objects are considered a single object with missing 3D image data.

11. The 3D camera assembly as set forth in claim 1, wherein the at least one processor is further configured to employ a dimensioning process that defines a minimum spacing between objects in the images, below which a plurality of objects are considered a single object with missing 3D image data.

12. The 3D camera assembly as set forth in claim 1, wherein the at least one processor is further configured to employ a dimensioning process that employs information related to features on the object to determine continuity of the object between each of the plurality of 3D images as the object moves in a motion direction.

13. The 3D camera assembly as set forth in claim 1, wherein the at least one processor is arranged to generate the aggregate feature data with respect to the object comprising,
   (a) out-of-length limit data,
   (b) out-of-width limit data,
   (c) out-of-height limit data,
   (d) out-of-volume limit data,
   (e) confidence score,
   (f) liquid volume,
   (g) categorization,
   (h) quantity (QTY) of data actually imaged of the object versus expected data imaged of the object,
   (i) location features of the object, or
   (j) detection of damage relative to the object.

* * * * *